US010723017B1

United States Patent
Xu et al.

(10) Patent No.: US 10,723,017 B1
(45) Date of Patent: Jul. 28, 2020

(54) ROBOTIC EYE SYSTEMS

(71) Applicant: SHENZHEN WANGRUI TECHNOLOGY CO., LTD., Shenzhen (CN)

(72) Inventors: Pianhong Xu, Shenzhen (CN); Tao Huang, Shenzhen (CN)

(73) Assignee: SHENZHEN WANGRUI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/371,373

(22) Filed: Apr. 1, 2019

(51) Int. Cl.
- *B25J 9/12* (2006.01)
- *B25J 11/00* (2006.01)
- *B25J 17/00* (2006.01)

(52) U.S. Cl.
CPC .............. *B25J 9/12* (2013.01); *B25J 11/00* (2013.01); *B25J 17/00* (2013.01)

(58) Field of Classification Search
CPC .................................... B25J 9/12; B25J 11/00
USPC .................................................. 318/567, 560
See application file for complete search history.

(56) References Cited

U.S. PATENT DOCUMENTS

| 7,680,667 B2 * | 3/2010 | Sonoura | G10L 15/26 318/568.11 |
| 7,778,730 B2 * | 8/2010 | Lee | G06N 3/008 700/245 |
| 10,120,387 B2 * | 11/2018 | Lee | B25J 11/0015 |

* cited by examiner

*Primary Examiner* — David Luo
(74) *Attorney, Agent, or Firm* — Ming Jiang; MM IP Services LLC

(57) ABSTRACT

Aspects of present disclosure relates to a robotic eye system. In certain embodiments, robotic eye driving system includes: a robotic eye body, a first eyeball and a second eyeball, a lower eyelid, an upper eyelid, an eyeball driving system, an eyelid driving system, and a robotic eye controller. Robotic eye body includes a front panel and a rear panel. Front panel includes a first eye socket and a second eye socket. First eyeball and second eyeball are positioned in first eye socket and second eye socket, respectively. First eye socket and second eye socket limit first eyeball and second eyeball to rotate around a first eyeball center and a second eyeball center, respectively. The eyeball driving system includes an eyeball vertical driving mechanism and an eyeball horizontal driving mechanism to drive the first eyeball and the second eyeball, and the eyelid driving system drives the upper eyelid, concurrently and independently.

19 Claims, 8 Drawing Sheets

_US 10,723,017 B1_

ROBOTIC EYE SYSTEMS

FIELD

The present disclosure generally relates to robotics, and more particularly to a robotic eyeball driving system, a robotic eyelid driving system and a robotic eye system having the robotic eyeball driving system and the robotic eyelid driving system.

BACKGROUND

Human eyes are one of the most important organs human beings interact with one another. According to certain statistics, more than 90% of information that humans perceive in their surroundings is obtained through their eyes. Eye rotation is an indispensable and very important feature in robot action and expression. Currently, driving mechanisms of robotic eyes are very complicated. Robotic eyes require large amount of very complex parts, and sometimes the size of the robotic eyes is not suitable for certain robots. Some robotic eyes don't have sufficient degrees of freedom. Some robotic eyes are unable to rotate as freely as human eyeballs, or unable to rotate naturally around their respective eye centers. It is desirable to have a robotic eye system that is natural and realistic in eye rotation and eye movement.

Therefore, a heretofore unaddressed need still exists in the art to address the aforementioned deficiencies and inadequacies.

SUMMARY

In one aspect, the present disclosure relates to a robotic eyeball driving system. In certain embodiments, the robotic eyeball driving system includes a robotic eye body, a first eyeball and a second eyeball, an eyeball vertical driving mechanism, and an eyeball horizontal driving mechanism. The robotic eye body includes a front panel having a first eye socket and a second eye socket, and a rear panel. The first eyeball and the second eyeball are positioned in the first eye socket and the second eye socket, respectively. The first eye socket and the second eye socket limit the first eyeball and the second eyeball to rotate around a first eyeball center and a second eyeball center, respectively.

In certain embodiments, the eyeball horizontal driving mechanism includes an eyeball horizontal movement frame. The first eyeball and the second eyeball are rotatably attached to the eyeball horizontal movement frame to drive the first eyeball and the second eyeball to rotate horizontally. The eyeball vertical driving mechanism includes an eyeball vertical movement block. The eyeball vertical movement block includes an upper holding arm and a lower holding arm of an eyeball horizontal movement frame holder. The upper holding arm and the lower holding arm of the eyeball horizontal movement frame holder holds the eyeball horizontal movement frame and allows the eyeball horizontal movement frame to slide horizontally.

When the eyeball vertical movement block moves vertically, the eyeball horizontal movement frame moves vertically along with the eyeball vertical movement block and drives the first eyeball and the second eyeball to rotate vertically. When the eyeball horizontal movement frame slides horizontally, the eyeball horizontal movement frame drives the first eyeball and the second eyeball to rotate horizontally. The eyeball vertical driving mechanism and the eyeball horizontal driving mechanism drive the first eyeball and the second eyeball, concurrently and independently.

In certain embodiments, the eyeball vertical driving mechanism includes: an eyeball vertical driving motor, a first eyeball vertical driving arm, a second eyeball vertical driving arm, an eyeball vertical driving shaft, and the eyeball vertical movement block. The eyeball vertical driving motor is used to drive the first eyeball and the second eyeball vertically. The eyeball vertical driving motor includes a first eyeball vertical rotation axial and the first eyeball vertical rotation axial rotates along a first eyeball vertical rotation axis. The first eyeball vertical driving arm is attached to the first eyeball vertical rotation axial. The second eyeball vertical driving arm is rotatably attached to the first eyeball vertical driving arm along a second eyeball vertical rotation axis. The eyeball vertical driving shaft is rotatably attached to the second eyeball vertical driving arm in one end and fixedly attached to the eyeball vertical movement block in another end.

In certain embodiments, when the eyeball vertical driving motor receives electrical power and eyeball vertical control signals from a robotic eye controller to move the first eyeball and the second eyeball upward, the eyeball vertical driving motor rotate counter-clockwise in a predetermined angle to rotate the first eyeball vertical driving arm counter-clockwise, the first eyeball vertical driving arm drives the second eyeball vertical driving arm downward, and drives the eyeball vertical movement block downward causing the first eyeball and the second eyeball to rotate upward synchronously. When the eyeball vertical driving motor receives the eyeball vertical control signals to move the first eyeball and the second eyeball downward, the eyeball vertical driving motor rotate clockwise in a predetermined angle to rotate the first eyeball vertical driving arm clockwise, the first eyeball vertical driving arm lifts the second eyeball vertical driving arm upward, and drives the eyeball vertical movement block upward causing the first eyeball and the second eyeball to rotate downward synchronously.

In certain embodiments, the eyeball horizontal driving mechanism includes: the eyeball horizontal movement frame, and an eyeball horizontal driving motor. The eyeball horizontal movement frame defines a first eyeball installation hole for hosting a first eyeball horizontal rotation axial along a first eyeball horizontal rotation axis. The eyeball horizontal movement frame also includes a cylindrical eyeball horizontal movement rod to allow the eyeball horizontal movement frame to slide horizontally and rotate along an eyeball vertical movement rotation axis when the eyeball vertical movement block moves vertically. The eyeball horizontal driving motor is positioned on the eyeball horizontal movement frame. The eyeball horizontal driving motor includes a second eyeball horizontal rotation axial rotating along a second eyeball horizontal rotation axis. The second eyeball horizontal rotation axial is attached to a second eyeball support of the second eyeball to rotate the second eyeball horizontally.

In certain embodiments, when the eyeball horizontal driving motor receives the electrical power and eyeball horizontal control signals from the robotic eye controller to move the first eyeball and the second eyeball to the left, the eyeball horizontal driving motor rotate clockwise in a predetermined angle to drive the second eyeball support to rotate clockwise around the second eyeball center, causing the eyeball horizontal movement frame to slide to the right, and the first eyeball and the second eyeball to rotate to the left synchronously. When the eyeball horizontal driving motor receives the eyeball horizontal control signals to move the first eyeball and the second eyeball to the right, the eyeball horizontal driving motor rotate counter-clockwise in a predetermined angle to drive the second eyeball support to rotate counter-clockwise around the second eyeball center, causing the eyeball horizontal movement frame to slide to the left, and the first eyeball and the second eyeball to rotate to the right synchronously.

In another aspect, the present disclosure relates to a robotic eyelid driving system. In certain embodiments, the robotic eyelid driving system includes: a robotic eye body, a lower eyelid, an upper eyelid, and an eyelid driving mechanism. The robotic eye body includes a front panel having a first eye socket and a second eye socket, and a rear panel. The lower eyelid includes a first lower eyelid and a second lower eyelid and the lower eyelid is fixedly attached to the front panel of the robotic eye body. The upper eyelid includes a first upper eyelid and a second upper eyelid. The upper eyelid is rotatably attached to the front panel of the robotic eye body along an upper eyelid rotating axis. The eyelid driving mechanism is used to drive the upper eyelid open and close to simulate eye blinking.

In certain embodiments, the eyelid driving mechanism includes: an eyelid driving motor, a first eyelid driving arm, an eyelid driving rod defining a second eyelid driving shaft hole in a first end and an upper eyelid driving shaft hole in a second end, and an upper eyelid driving arm having an upper eyelid driving shaft in a first end, and a second end attached to an upper eyelid rotating shaft. The eyelid driving motor is used to drive the upper eyelid. The eyelid driving motor rotates along a first eyelid driving axis through a first eyelid driving shaft. The first eyelid driving arm includes a first eyelid driving shaft hole in a first end to receive the first eyelid driving shaft and a second eyelid driving shaft in a second end to rotatably attach to the second eyelid driving shaft hole of the eyelid driving rod. The upper eyelid driving shaft of the upper eyelid driving arm is rotatably attached to the upper eyelid driving shaft hole of the eyelid driving rod.

In certain embodiments, when the eyelid driving motor receives electrical power and eyelid control signals from a robotic eye controller to close the upper eyelid, the eyelid driving motor rotate counter-clockwise in a predetermined angle to rotate the first eyelid driving arm counter-clockwise, the first eyelid driving arm drives the eyelid driving rod backward causing the upper eyelid to rotate along the upper eyelid rotating axis to close the upper eyelid. When the eyelid driving motor receives the eyelid control signals to open the upper eyelid, the eyelid driving motor rotate clockwise in a predetermined angle to rotate the first eyelid driving arm clockwise, the first eyelid driving arm drives the eyelid driving rod forward causing the upper eyelid to rotate along the upper eyelid rotating axis to open the upper eyelid.

In yet another aspect, the present disclosure relates to a robotic eye system. In certain embodiments, the robotic eye system includes: a robotic eye body, a first eyeball and a second eyeball, a lower eyelid, an upper eyelid, an eyeball vertical driving mechanism, an eyeball horizontal driving mechanism, an eyelid driving mechanism, and a robotic eye controller. The robotic eye body includes a front panel and a rear panel. The front panel includes a first eye socket and a second eye socket, and the rear panel includes a sliding block. The first eyeball and a second eyeball are positioned in the first eye socket and the second eye socket, respectively. The first eye socket and the second eye socket limit the first eyeball and the second eyeball to rotate around a first eyeball center and a second eyeball center, respectively.

In certain embodiments, the lower eyelid includes a first lower eyelid and a second lower eyelid. The lower eyelid is fixedly attached to the front panel of the robotic eye body. The upper eyelid includes a first upper eyelid and a second upper eyelid. The upper eyelid is rotatably attached to the front panel of the robotic eye body along an upper eyelid rotating axis.

In certain embodiments, the eyeball horizontal driving mechanism includes an eyeball horizontal movement frame. The first eyeball and the second eyeball are rotatably attached to the eyeball horizontal movement frame to drive the first eyeball and the second eyeball to rotate horizontally. The eyeball vertical driving mechanism includes an eyeball vertical movement block. The eyeball vertical movement block includes an eyeball horizontal movement frame holder, and the eyeball horizontal movement frame holder includes an upper holding arm and a lower holding arm. The upper holding arm and the lower holding arm of the eyeball horizontal movement frame holder holds the eyeball horizontal movement frame and allows the eyeball horizontal movement frame to slide horizontally. In certain embodiments, the eyelid driving mechanism drives the upper eyelid open and close to simulate eye blinking. The robotic eye controller receives eyeball control input signals and eyelid control input signals and generate eyeball vertical control signals, eyeball horizontal control signals, and eyelid control signals for driving the first eyeball, the second eyeball, and the upper eyelid respectively.

In certain embodiments, the eyeball vertical driving mechanism and the eyeball horizontal driving mechanism drive the first eyeball and the second eyeball, and the eyelid driving mechanism drives the upper eyelid, concurrently and independently.

In certain embodiments, the first upper eyelid and the first lower eyelid form the first eye socket on the front panel of the robotic eye body, and the second upper eyelid and the second lower eyelid form the second eye socket on the front panel of the robotic eye body, respectively.

In certain embodiments, the robotic eye controller includes: a processor and a non-volatile storage device storing an operating system, and computer executable instructions. The computer executable instructions include a robotic eye control input module, an eyeball control module having an eyeball vertical control module and an eyeball horizontal control module, and an eyelid control module. When executed by the processor, the computer executable instructions cause the processor to perform: receiving, by the robotic eye control input module, eyeball control input signals and eyelid control input signals from a robotic controller, transmitting the eyeball control input signals to the eyeball control module, and the eyelid control input signals to the eyelid control module.

When the eyeball control input signals contain vertical movement signals, the computer executable instructions cause the eyeball vertical control module to generate the eyeball vertical control signals and transmitting the eyeball vertical control signals generated to the eyeball vertical driving mechanism of the robotic eyeball driving system to drive the first eyeball and the second eyeball to move vertically.

When the eyeball control input signals contain horizontal movement signals, the computer executable instructions cause the eyeball horizontal control module to generate the eyeball horizontal control signals and transmitting the eyeball horizontal control signals generated to the eyeball horizontal driving mechanism of the robotic eyeball driving system to drive the first eyeball and the second eyeball to move horizontally.

When the eyelid control input signals contain eyelid movement signals, the computer executable instructions cause the eyelid control module to generate the eyelid control signals and transmitting the eyelid control signals generated to the eyelid driving mechanism to drive the upper eyelid to move up and down.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
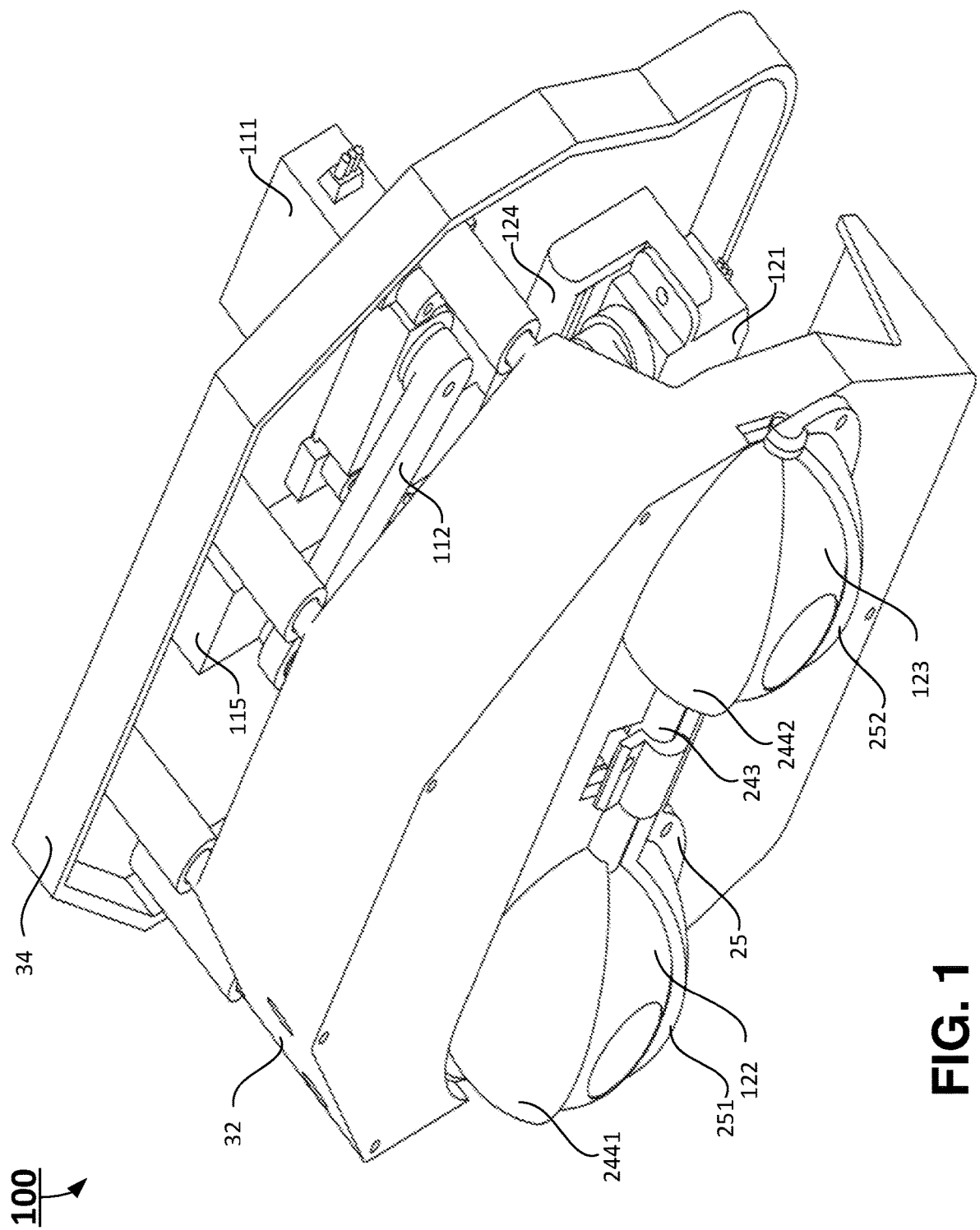
FIG. 1 shows a perspective view of a robotic eye system as assembled according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1 through 8, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In one aspect, the present disclosure relates to a robotic eyeball driving system 10, as shown in FIGS. 1 through 4. In certain embodiments, the robotic eyeball driving system 10 includes a robotic eye body 30, a first eyeball 122 and a second eyeball 123, an eyeball vertical driving mechanism 11, and an eyeball horizontal driving mechanism 12. The robotic eye body 30 includes a front panel 32 and a rear panel 34. The front panel 32 includes a first eye socket 321 and a second eye socket 322. The first eyeball 122 and the second eyeball 123 are positioned in the first eye socket 321 and the second eye socket 322, respectively. The first eye socket 321 and the second eye socket 322 limit the first eyeball 122 and the second eyeball 123 to rotate around a first eyeball center 1221 and a second eyeball center 1231, respectively.

In certain embodiments, the eyeball horizontal driving mechanism 12 includes an eyeball horizontal movement frame 124. The first eyeball 122 and the second eyeball 123 are rotatably attached to the eyeball horizontal movement frame 124 to drive the first eyeball 122 and the second eyeball 123 to rotate horizontally. The eyeball vertical driving mechanism 11 includes an eyeball vertical movement block 115. The eyeball vertical movement block 115 includes an eyeball horizontal movement frame holder 1152, and the eyeball horizontal movement frame holder 1152 has an upper holding arm 11521 and a lower holding arm 11522. The upper holding arm 11521 and the lower holding arm 11522 of the eyeball horizontal movement frame holder 1152 holds the eyeball horizontal movement frame 124 and allows the eyeball horizontal movement frame 124 to slide horizontally.

When the eyeball vertical movement block 115 moves vertically, the eyeball horizontal movement frame 124 moves vertically along with the eyeball vertical movement block 115 and drives the first eyeball 122 and the second eyeball 123 to rotate vertically. When the eyeball horizontal movement frame 124 slides horizontally, the eyeball horizontal movement frame 124 drives the first eyeball 122 and the second eyeball 123 to rotate horizontally. The eyeball vertical driving mechanism 11 and the eyeball horizontal driving mechanism 12 drive the first eyeball 122 and the second eyeball 123, concurrently and independently.

Figure 2:
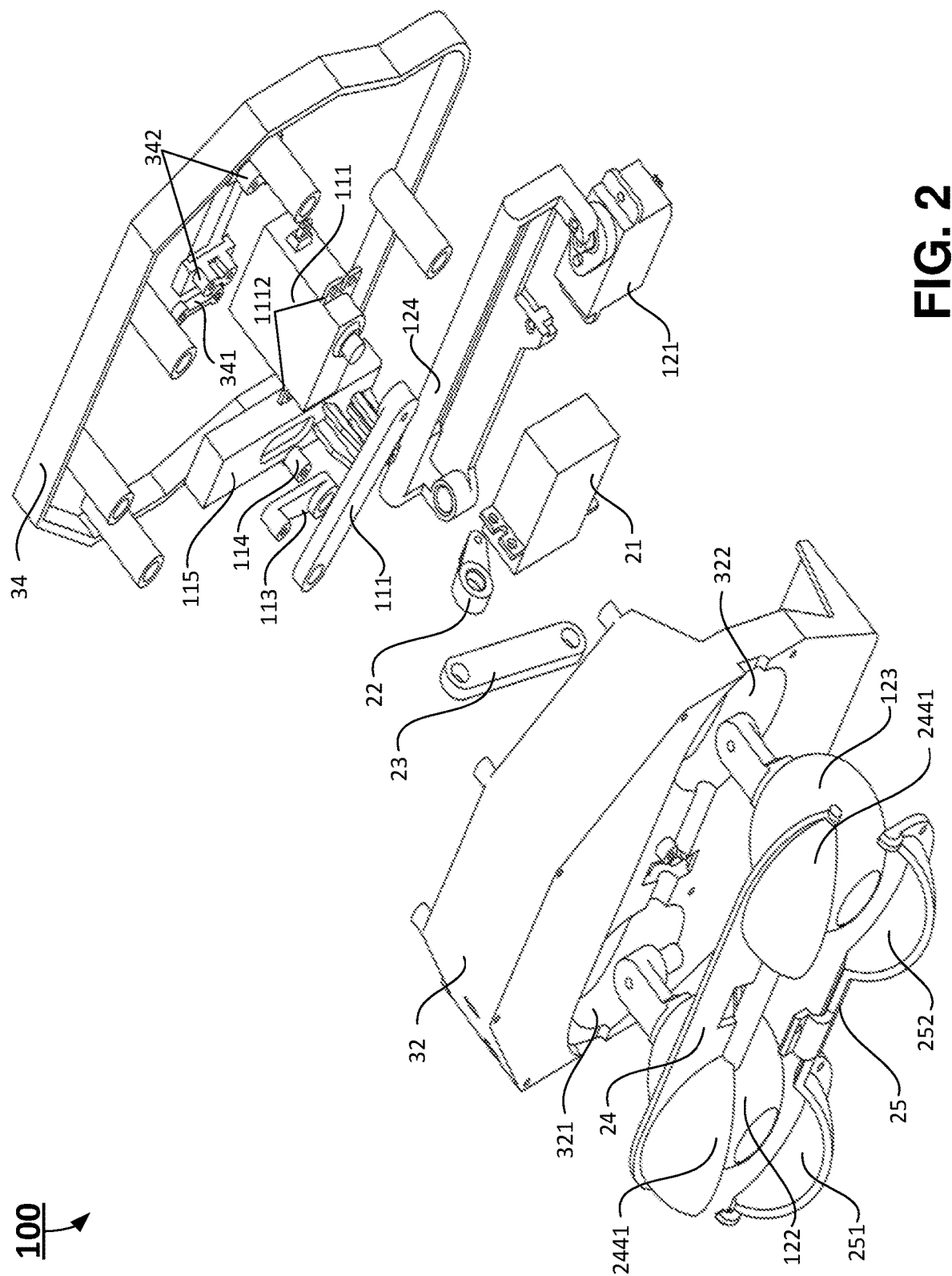
FIG. 2 shows an exploded perspective view of the robotic eye system according to certain embodiments of the present disclosure.
Figure 7:
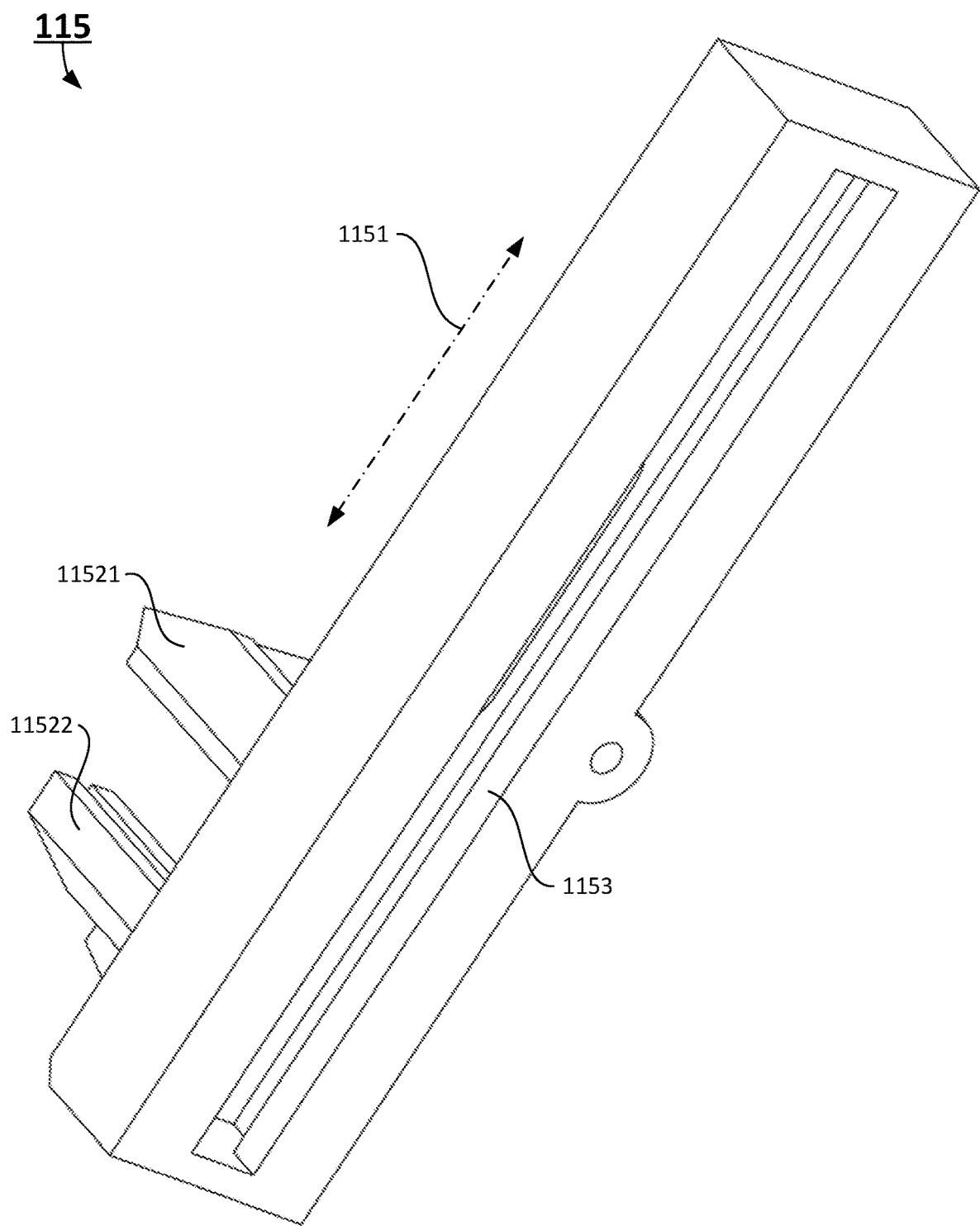
FIG. 7 shows a perspective view of an eyeball vertical movement block of the robotic eyelid driving system according to certain embodiments of the present disclosure.

Referring now to FIG. 7, in certain embodiments, the eyeball vertical movement block 115 includes a sliding groove 1153. In certain embodiments, as shown in FIG. 2, the rear panel 34 includes a sliding block 341 for the eyeball vertical movement block 115. When the robotic eye system 100 is assembled, the sliding block 341 is positioned inside the sliding groove 1153 of the eyeball vertical movement block 115 to limit the eyeball vertical movement block 115 to move vertically along an eyeball vertical movement direction 1151.

In certain embodiments, the eyeball vertical driving mechanism 11 includes: an eyeball vertical driving motor 111, a first eyeball vertical driving arm 112, a second eyeball vertical driving arm 113, an eyeball vertical driving shaft 114, and the eyeball vertical movement block 115. The eyeball vertical driving motor 111 is used to drive the first eyeball 122 and the second eyeball 123 vertically. The eyeball vertical driving motor 111 includes a first eyeball vertical rotation axial 1111, and the first eyeball vertical rotation axial 1111 rotates along a first eyeball vertical rotation axis 11111. The first eyeball vertical driving arm 112 is attached to the first eyeball vertical rotation axial 1111. The second eyeball vertical driving arm 113 is rotatably attached to the first eyeball vertical driving arm 112 along a second eyeball vertical rotation axis 1121. The eyeball vertical driving shaft 114 is rotatably attached to the second eyeball vertical driving arm 113 in one end and fixedly attached to the eyeball vertical movement block 115 in another end.

Figure 8:
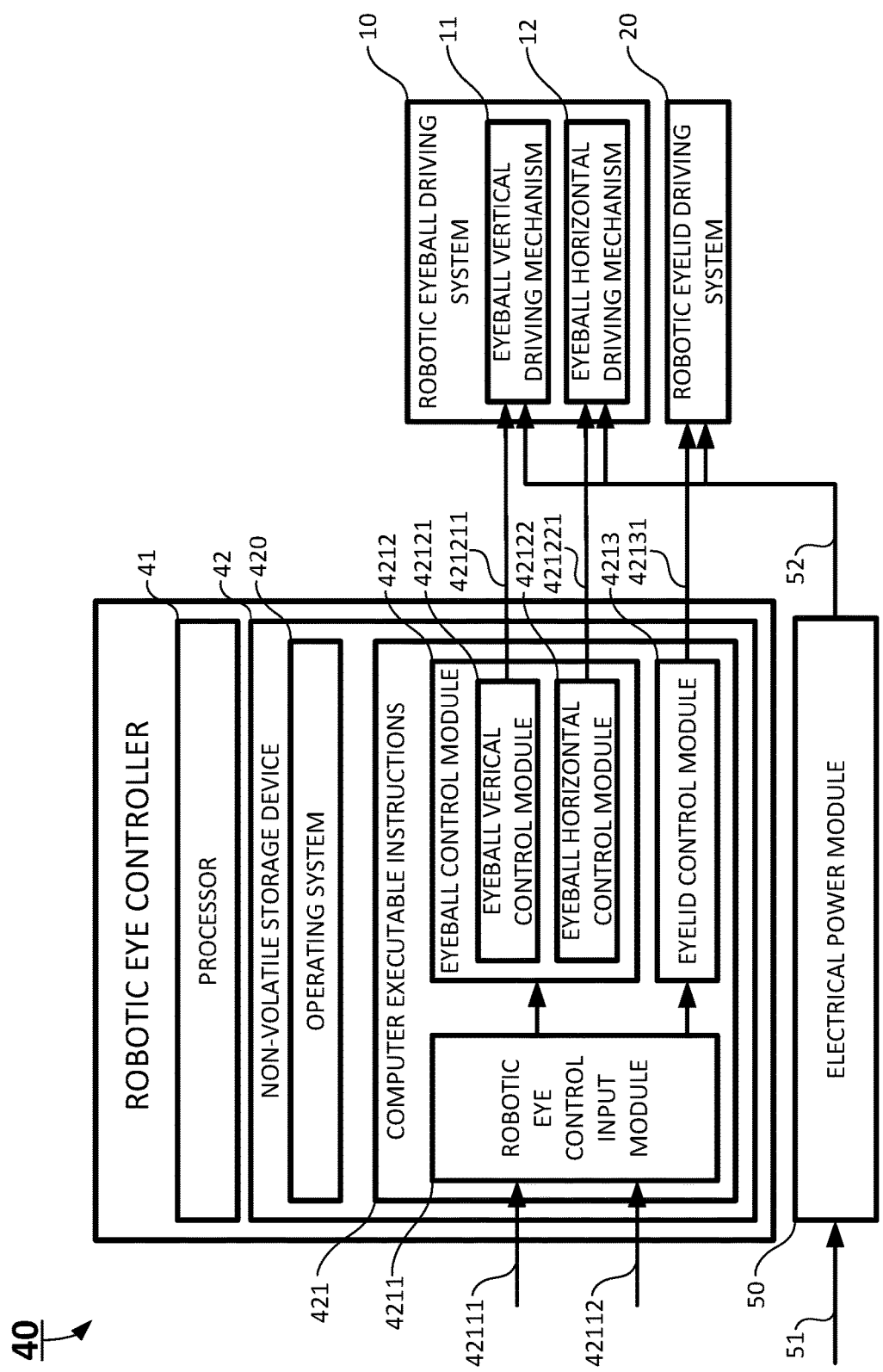
FIG. 8 shows a block diagram of a robotic eye controller of the robotic eye system according to certain embodiments of the present disclosure.

When the eyeball vertical driving motor 111 receives electrical power 52 from an electrical power module 50 and eyeball vertical control signals 421211 from a robotic eye controller 40, shown in FIG. 8, to move the first eyeball 122 and the second eyeball 123 upward, the eyeball vertical driving motor 111 rotate counter-clockwise in a predetermined angle to rotate the first eyeball vertical driving arm 112 counter-clockwise, the first eyeball vertical driving arm 112 drives the second eyeball vertical driving arm 113 downward, and drives the eyeball vertical movement block 115 downward causing the first eyeball 122 and the second eyeball 123 to rotate upward synchronously. When the eyeball vertical driving motor 111 receives the eyeball vertical control signals 421211 to move the first eyeball 122 and the second eyeball 123 downward, the eyeball vertical driving motor 111 rotate clockwise in a predetermined angle to rotate the first eyeball vertical driving arm 112 clockwise, the first eyeball vertical driving arm 112 lifts the second eyeball vertical driving arm 113 upward, and drives the eyeball vertical movement block 115 upward causing the first eyeball 122 and the second eyeball 123 to rotate downward synchronously.

In certain embodiments, the eyeball horizontal driving mechanism 12 includes: the eyeball horizontal movement frame 124, and an eyeball horizontal driving motor 121. The eyeball horizontal movement frame 124 defines a first eyeball installation hole 1242 for hosting a first eyeball horizontal rotation axial 12221 along a first eyeball horizontal rotation axis 1223. The first eyeball 122 is attached to a first eyeball support 1222 and the first eyeball support 1222 includes the first eyeball horizontal rotation axial 12221. The eyeball horizontal movement frame 124 also includes a cylindrical eyeball horizontal movement rod 1241 to allow the eyeball horizontal movement frame 124 to slide horizontally along an eyeball horizontal movement direction 12411 and rotate along an eyeball vertical movement rotation axis 12412 when the eyeball vertical movement block 115 moves vertically. The eyeball horizontal driving motor 121 is positioned on the eyeball horizontal movement frame 124. The eyeball horizontal driving motor 121 includes a second eyeball horizontal rotation axial 1211 rotating along a second eyeball horizontal rotation axis 1233. The second eyeball horizontal rotation axial 1211 is attached to a second eyeball support 1232 of the second eyeball 123 to rotate the second eyeball 123 horizontally.

In certain embodiments, when the eyeball horizontal driving motor 121 receives the electrical power 52 and eyeball horizontal control signals 421221 from the robotic eye controller 40 to move the first eyeball 122 and the second eyeball 123 to the left, the eyeball horizontal driving motor 121 rotate clockwise in a predetermined angle to drive the second eyeball support 1232 to rotate clockwise around the second eyeball center 1231, causing the eyeball horizontal movement frame 124 to slide to the right, and the first eyeball 122 and the second eyeball 123 to rotate to the left synchronously. When the eyeball horizontal driving motor 121 receives the eyeball horizontal control signals 421221 to move the first eyeball 122 and the second eyeball 123 to the right, the eyeball horizontal driving motor 121 rotate counter-clockwise in a predetermined angle to drive the second eyeball support 1232 to rotate counter-clockwise around the second eyeball center 1231, causing the eyeball horizontal movement frame 124 to slide to the left, and the first eyeball 122 and the second eyeball 123 to rotate to the right synchronously.

Figure 3:
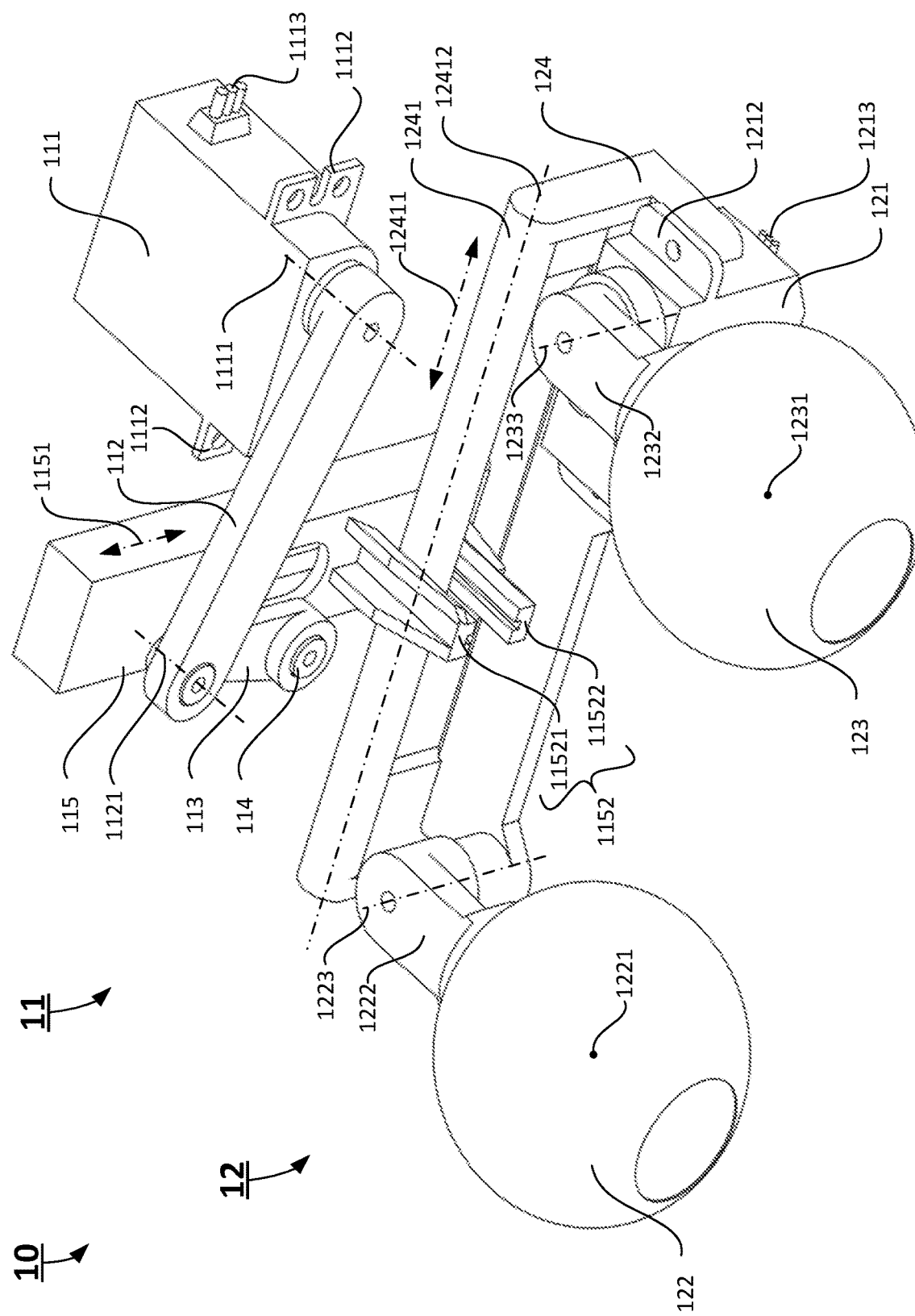
FIG. 3 shows a perspective view of a robotic eyeball driving system as assembled according to certain embodiments of the present disclosure.
Figure 4:
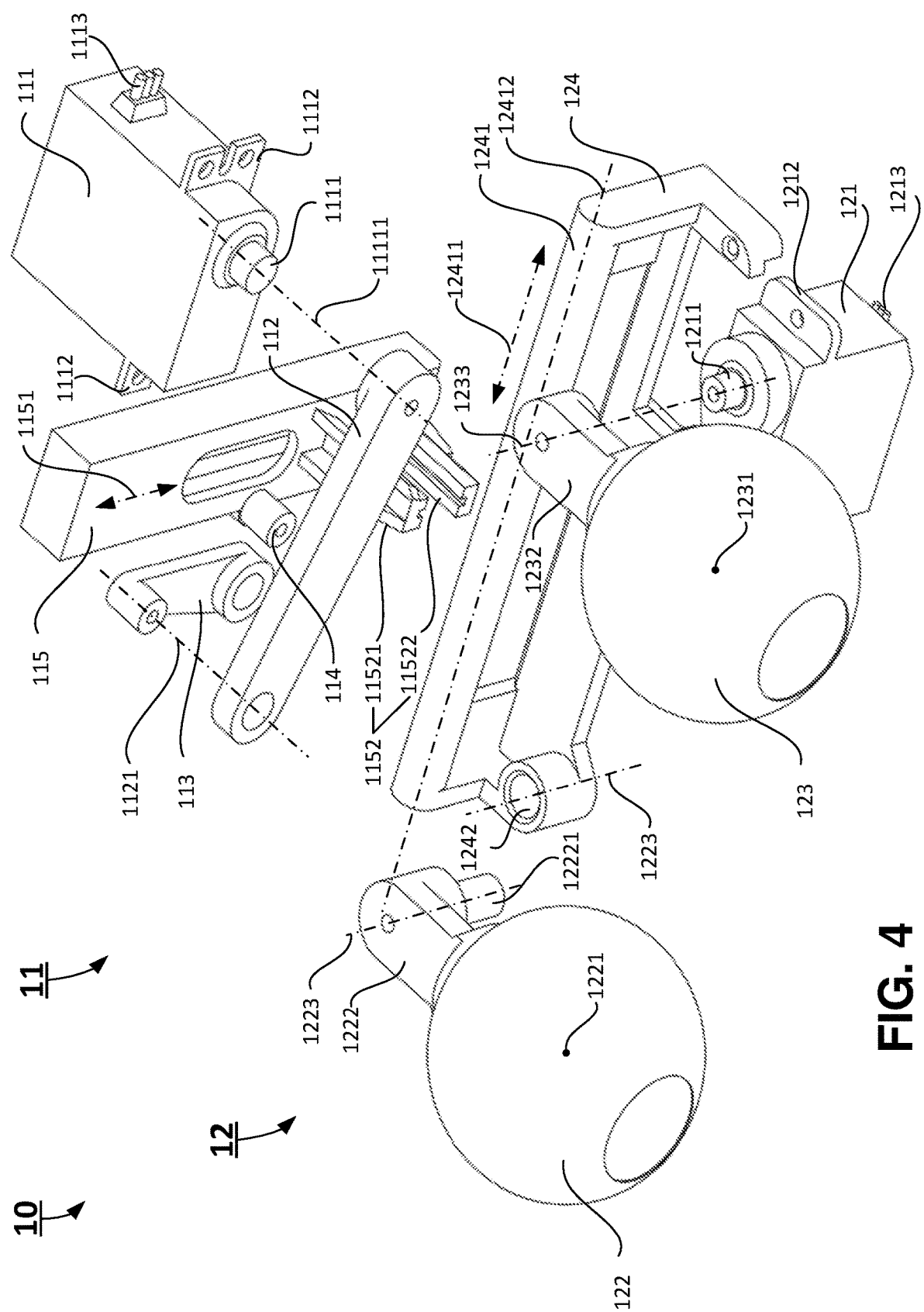
FIG. 4 shows an exploded perspective view of the robotic eyeball driving system according to certain embodiments of the present disclosure.
Figure 5:
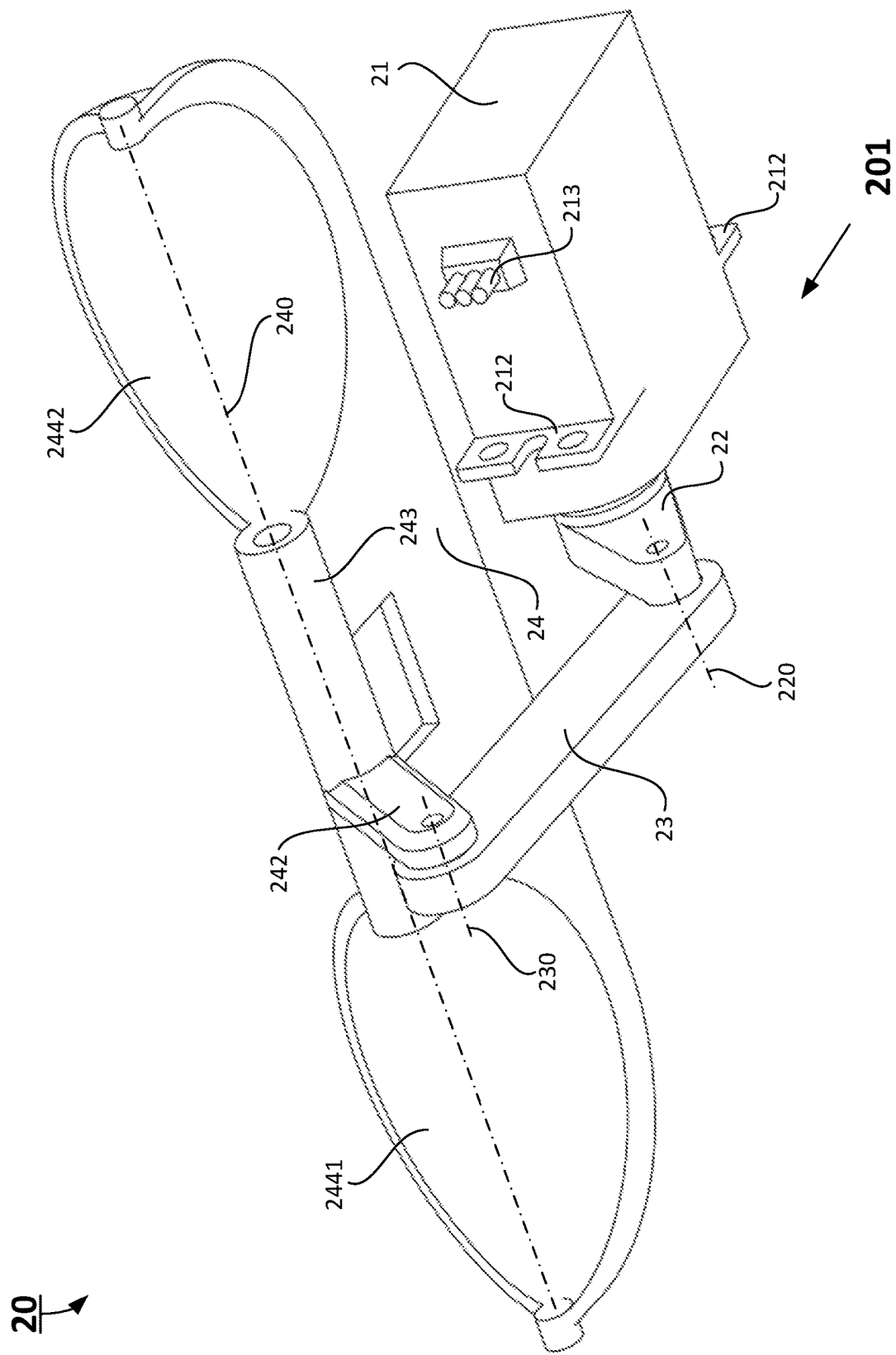
FIG. 5 shows a perspective view of a robotic eyelid driving system as assembled according to certain embodiments of the present disclosure.

In certain embodiments, as shown in FIG. 2, the rear panel 34 of the robotic eye body 30 includes a pair of eyeball vertical driving motor support 342. As shown in FIGS. 3 and 4, the eyeball vertical driving motor 111 is positioned on the eyeball vertical driving motor support 342 on the rear panel 34 of the robotic eye body 30 through a pair of eyeball vertical driving motor mounting brackets 1112, and the eyeball vertical driving motor 111 includes a set of eyeball vertical driving motor control input terminals 1113 to receive the electrical power 52 and the eyeball vertical control signals 421211. The eyeball horizontal driving motor 121 is positioned on the eyeball horizontal movement frame 124 through a pair of eyeball horizontal driving motor mounting bracket 1212, and the eyeball horizontal driving motor 121 includes a set of eyeball horizontal driving motor control input terminals 1213 to receive the electrical power 52 and the eyeball horizontal control signals 421221.

In another aspect, the present disclosure relates to a robotic eyelid driving system 20, as shown in FIGS. 1-2 and 5-6. In certain embodiments, the robotic eyelid driving system 20 includes: a robotic eye body 30, a lower eyelid 25, an upper eyelid 24, and an eyelid driving mechanism 201. The robotic eye body 30 includes a front panel 32 and a rear panel 34. The front panel 32 includes a first eye socket 321 and a second eye socket 322. The lower eyelid 25 includes a first lower eyelid 251 and a second lower eyelid 252. The lower eyelid 25 is fixedly attached to the front panel 32 of the robotic eye body 30. The upper eyelid 24 includes a first upper eyelid 2441 and a second upper eyelid 2442. The upper eyelid 24 is rotatably attached to the front panel 32 of the robotic eye body 30 along an upper eyelid rotating axis 240. The eyelid driving mechanism 201 is used to drive the upper eyelid 24 open and close to simulate eye blinking.

In certain embodiments, the first upper eyelid 2441 and the first lower eyelid 251 form the first eye socket 321, and the second upper eyelid 2442 and the second lower eyelid 252 form the second eye socket 322, respectively.

Figure 6:
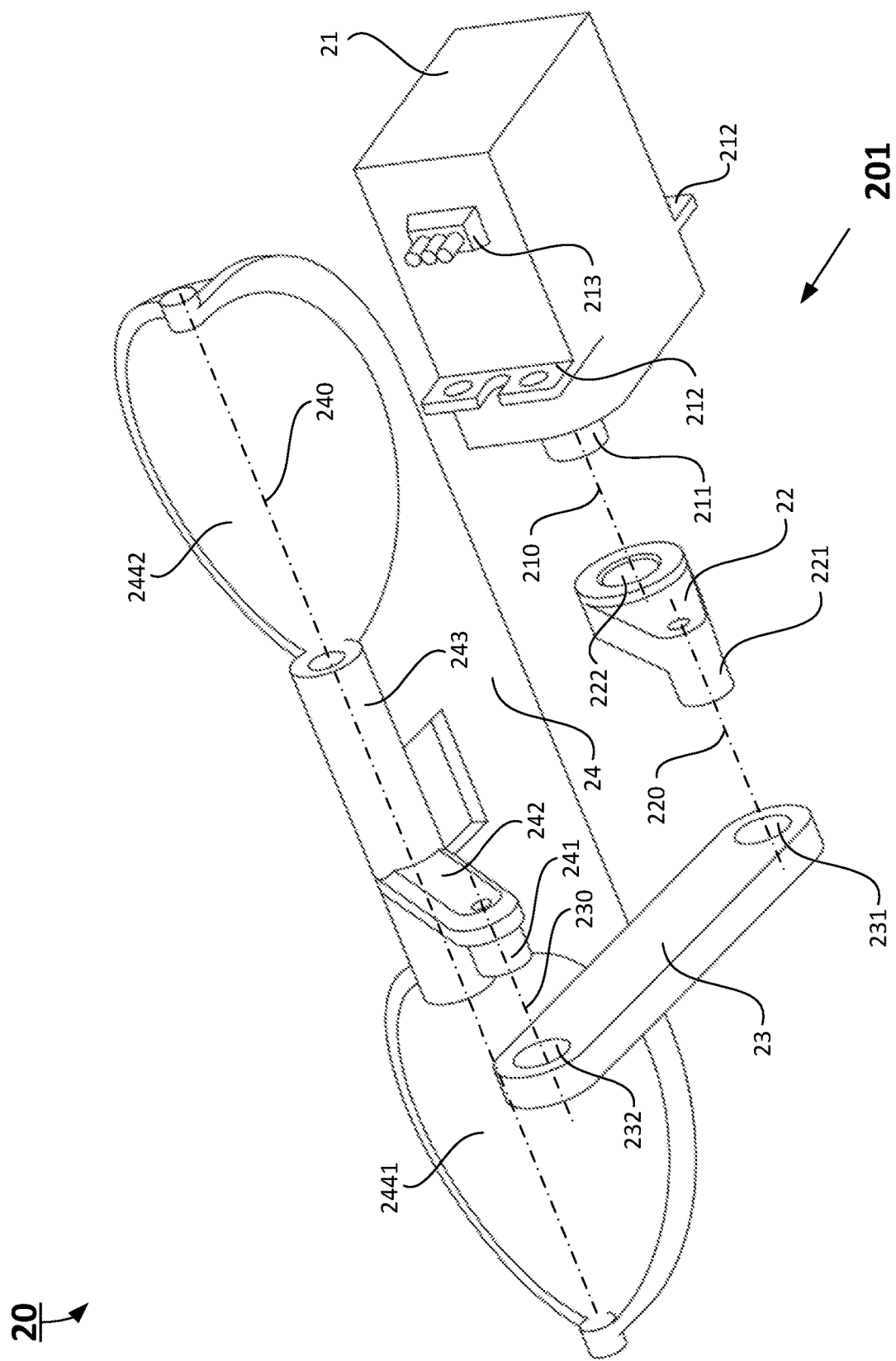
FIG. 6 shows an exploded perspective view of the robotic eyelid driving system according to certain embodiments of the present disclosure.

In certain embodiments, as shown in FIG. 6, the eyelid driving mechanism 201 includes: an eyelid driving motor 21, a first eyelid driving arm 22, an eyelid driving rod 23, and the upper eyelid 24. The eyelid driving rod 23 defines a second eyelid driving shaft hole 231 in a first end and an upper eyelid driving shaft hole 232 in a second end. The upper eyelid 24 includes an upper eyelid driving arm 242 having an upper eyelid driving shaft 241 in a first end, and a second end attached to an upper eyelid rotating shaft 243. The eyelid driving motor 21 drives the upper eyelid 24. The eyelid driving motor 21 rotates along a first eyelid driving axis 210 through a first eyelid driving shaft 211. The first eyelid driving arm 22 includes a first eyelid driving shaft hole 222 in a first end to receive the first eyelid driving shaft 211 and a second eyelid driving shaft 221 in a second end to rotatably attach to the second eyelid driving shaft hole 231 of the eyelid driving rod 23 to allow the second eyelid driving shaft 221 to rotate along a second eyelid driving axis 220. The upper eyelid driving shaft 241 of the upper eyelid driving arm 242 is rotatably attached to the upper eyelid driving shaft hole 232 of the eyelid driving rod 23 to allow the upper eyelid driving shaft 241 of the upper eyelid driving arm 242 to rotate along a third eyelid driving axis 230.

In certain embodiments, when the eyelid driving motor 21 receives electrical power 52 from an electrical power module 50 and eyelid control signals 42131 from a robotic eye controller 40, as shown in FIG. 8, to close the upper eyelid 24, the eyelid driving motor 21 rotate counter-clockwise in a predetermined angle to rotate the first eyelid driving arm 22 counter-clockwise, the first eyelid driving arm 22 drives the eyelid driving rod 23 backward causing the upper eyelid 24 to rotate along the upper eyelid rotating axis 240 to close the upper eyelid 24. When the eyelid driving motor 21 receives the eyelid control signals 42131 to open the upper eyelid 24, the eyelid driving motor 21 rotate clockwise in a predetermined angle to rotate the first eyelid driving arm 22 clockwise, the first eyelid driving arm 22 drives the eyelid driving rod 23 forward causing the upper eyelid 24 to rotate along the upper eyelid rotating axis 240 to open the upper eyelid 24.

In certain embodiments, the eyelid driving motor 21 is positioned on the front panel 32 of the robotic eye body 30 through a pair of eyelid driving motor mounting brackets 212. The eyelid driving motor 21 also includes a set of eyelid driving motor control input terminals 213 to receive the electrical power 52 and the eyelid control signals 42131.

In yet another aspect, as shown in FIGS. 1-8, the present disclosure relates to a robotic eye system 100. In certain embodiments, the robotic eye system 100 includes: a robotic eye body 30, a first eyeball 122 and a second eyeball 123, a lower eyelid 25, an upper eyelid 24, an eyeball driving system 10, an eyelid driving system 20, and a robotic eye controller 40. The eyeball driving system 10 includes an eyeball vertical driving mechanism 11 and an eyeball horizontal driving mechanism 12.

The robotic eye body 30 includes a front panel 32, and a rear panel 34. The front panel 32 includes a first eye socket 321 and a second eye socket 322, and the rear panel 34 includes a sliding block 341. The first eyeball 122 and a second eyeball 123 are positioned in the first eye socket 321 and the second eye socket 322, respectively. The first eye socket 321 and the second eye socket 322 limit the first eyeball 122 and the second eyeball 123 to rotate around a first eyeball center 1221 and a second eyeball center 1231, respectively.

In certain embodiments, the lower eyelid 25 includes a first lower eyelid 251 and a second lower eyelid 252. The lower eyelid 25 is fixedly attached to the front panel 32 of the robotic eye body 30. The upper eyelid 24 includes a first upper eyelid 2441 and a second upper eyelid 2442. The upper eyelid 24 is rotatably attached to the front panel 32 of the robotic eye body 30 along an upper eyelid rotating axis 240.

In certain embodiments, as shown in FIGS. 2-4, the eyeball horizontal driving mechanism 12 includes an eyeball horizontal movement frame 124. The first eyeball 122 and the second eyeball 123 are rotatably attached to the eyeball horizontal movement frame 124 to drive the first eyeball 122 and the second eyeball 123 to rotate horizontally. The eyeball vertical driving mechanism 11 includes an eyeball vertical movement block 115. The eyeball vertical movement block 115 includes an eyeball horizontal movement frame holder 1152, and the eyeball horizontal movement frame holder 1152 includes an upper holding arm 11521 and a lower holding arm 11522. The upper holding arm 11521 and the lower holding arm 11522 of the eyeball horizontal movement frame holder 1152 holds the eyeball horizontal movement frame 124 and allows the eyeball horizontal movement frame 124 to slide horizontally.

In certain embodiments, as shown in FIGS. 5-8, the eyelid driving mechanism 201 drives the upper eyelid 24 open and close to simulate eye blinking. The robotic eye controller 40 receives eyeball control input signals 42111 and eyelid control input signals 42112 and generate eyeball vertical control signals 421211, eyeball horizontal control signals 421221, and eyelid control signals 42131 for driving the first eyeball 122, the second eyeball 123, and the upper eyelid 24 respectively.

In certain embodiments, the eyeball vertical driving mechanism 11 and the eyeball horizontal driving mechanism 12 drive the first eyeball 122 and the second eyeball 123, and the eyelid driving mechanism 201 drives the upper eyelid 24, concurrently and independently.

In certain embodiments, as shown in FIG. 7, the eyeball vertical movement block 115 includes a sliding groove 1153. The rear panel 34 of the robotic eye body 30 includes a sliding block 341, as shown in FIG. 2, for the eyeball vertical movement block 115. When the robotic eye system 100 is assembled, the sliding block 341 is positioned inside the sliding groove 1153 of the eyeball vertical movement block 115 to limit the eyeball vertical movement block 115 to move vertically along an eyeball vertical movement direction 1151.

In certain embodiments, as shown in FIGS. 3-4, the eyeball vertical driving mechanism 11 includes: an eyeball vertical driving motor 111, a first eyeball vertical driving arm 112, a second eyeball vertical driving arm 113, an eyeball vertical driving shaft 114, and the eyeball vertical movement block 115. The eyeball vertical driving motor 111 is used to drive the first eyeball 122 and the second eyeball 123 vertically. The eyeball vertical driving motor 111 includes a first eyeball vertical rotation axial 1111, and the first eyeball vertical rotation axial 1111 rotates along a first eyeball vertical rotation axis 11111. The first eyeball vertical driving arm 112 is attached to the first eyeball vertical rotation axial 1111. The second eyeball vertical driving arm 113 is rotatably attached to the first eyeball vertical driving arm 112 along a second eyeball vertical rotation axis 1121. The eyeball vertical driving shaft 114 is rotatably attached to the second eyeball vertical driving arm 113 in one end and fixedly attached to the eyeball vertical movement block 115 in another end.

When the eyeball vertical driving motor 111 receives electrical power 52 from an electrical power module 50 and eyeball vertical control signals 421211 from a robotic eye controller 40 to move the first eyeball 122 and the second eyeball 123 upward, the eyeball vertical driving motor 111 rotate counter-clockwise in a predetermined angle to rotate the first eyeball vertical driving arm 112 counter-clockwise. The first eyeball vertical driving arm 112 drives the second eyeball vertical driving arm 113 downward, and drives the eyeball vertical movement block 115 downward causing the first eyeball 122 and the second eyeball 123 to rotate upward synchronously. When the eyeball vertical driving motor 111 receives the eyeball vertical control signals 421211 to move the first eyeball 122 and the second eyeball 123 downward, the eyeball vertical driving motor 111 rotate clockwise in a predetermined angle to rotate the first eyeball vertical driving arm 112 clockwise. The first eyeball vertical driving arm 112 lifts the second eyeball vertical driving arm 113 upward, and drives the eyeball vertical movement block 115 upward causing the first eyeball 122 and the second eyeball 123 to rotate downward synchronously.

In certain embodiments, also as shown in FIGS. 3-4, the eyeball horizontal driving mechanism 12 includes: the eyeball horizontal movement frame 124, and an eyeball horizontal driving motor 121. The eyeball horizontal movement frame 124 defines a first eyeball installation hole 1242 for hosting a first eyeball horizontal rotation axial 12221 along a first eyeball horizontal rotation axis 1223. The first eyeball 122 is attached to a first eyeball support 1222 and the first eyeball support 1222 includes the first eyeball horizontal rotation axial 12221. The eyeball horizontal movement frame 124 also includes a cylindrical eyeball horizontal movement rod 1241 to allow the eyeball horizontal movement frame 124 to slide horizontally along an eyeball horizontal movement direction 12411 and rotate along an eyeball vertical movement rotation axis 12412 when the eyeball vertical movement block 115 moves vertically. The eyeball horizontal driving motor 121 is positioned on the eyeball horizontal movement frame 124. The eyeball horizontal driving motor 121 includes a second eyeball horizontal rotation axial 1211 rotating along a second eyeball horizontal rotation axis 1233. The second eyeball horizontal rotation axial 1211 is attached to a second eyeball support 1232 of the second eyeball 123 to rotate the second eyeball 123 horizontally.

When the eyeball horizontal driving motor 121 receives the electrical power 52 and the eyeball horizontal control signals 421221 from the robotic eye controller 40 to move the first eyeball 122 and the second eyeball 123 to the left, the eyeball horizontal driving motor 121 rotate clockwise in a predetermined angle to drive the second eyeball support 1232 to rotate clockwise around the second eyeball center 1231, causing the eyeball horizontal movement frame 124 to slide to the right, and the first eyeball 122 and the second eyeball 123 to rotate to the left synchronously. When the eyeball horizontal driving motor 121 receives the eyeball horizontal control signals 421221 to move the first eyeball 122 and the second eyeball 123 to the right, the eyeball horizontal driving motor 121 rotate counter-clockwise in a predetermined angle to drive the second eyeball support 1232 to rotate counter-clockwise around the second eyeball center 1231, causing the eyeball horizontal movement frame 124 to slide to the left, and the first eyeball 122 and the second eyeball 123 to rotate to the right synchronously.

In certain embodiments, as shown in FIG. 2, the rear panel 34 of the robotic eye body 30 includes a pair of eyeball vertical driving motor support 342. As shown in FIGS. 3 and 4, the eyeball vertical driving motor 111 is positioned on the eyeball vertical driving motor support 342 on the rear panel 34 of the robotic eye body 30 through a pair of eyeball vertical driving motor mounting brackets 1112, and the eyeball vertical driving motor 111 includes a set of eyeball vertical driving motor control input terminals 1113 to receive the electrical power 52 and the eyeball vertical control signals 421211. The eyeball horizontal driving motor 121 is positioned on the eyeball horizontal movement frame 124 through a pair of eyeball horizontal driving motor mounting bracket 1212, and the eyeball horizontal driving motor 121 includes a set of eyeball horizontal driving motor control input terminals 1213 to receive the electrical power 52 and the eyeball horizontal control signals 421221.

In certain embodiments, the first upper eyelid 2441 and the first lower eyelid 251 form the first eye socket 321 on the front panel 32 of the robotic eye body 30, and the second upper eyelid 2442 and the second lower eyelid 252 form the second eye socket 322 on the front panel 32 of the robotic eye body 30, respectively.

In certain embodiments, as shown in FIGS. 5-8, the eyelid driving mechanism 201 includes: an eyelid driving motor 21, a first eyelid driving arm 22, an eyelid driving rod 23 defining a second eyelid driving shaft hole 231 in a first end and an upper eyelid driving shaft hole 232 in a second end, and an upper eyelid driving arm 242 having an upper eyelid driving shaft 241 in a first end, and a second end attached to an upper eyelid rotating shaft 243. The eyelid driving motor 21 is used to drive the upper eyelid 24. The eyelid driving motor 21 rotates along a first eyelid driving axis 210 through a first eyelid driving shaft 211. The first eyelid driving arm 22 includes a first eyelid driving shaft hole 222 in a first end to receive the first eyelid driving shaft 211 and a second eyelid driving shaft 221 in a second end to rotatably attach to the second eyelid driving shaft hole 231 of the eyelid driving rod 23 to allow the second eyelid driving shaft 221 to rotate along a second eyelid driving axis 220. The upper eyelid driving shaft 241 of the upper eyelid driving arm 242 is rotatably attached to the upper eyelid driving shaft hole 232 of the eyelid driving rod 23 to allow the upper eyelid driving shaft 241 of the upper eyelid driving arm 242 to rotate along a third eyelid driving axis 230.

When the eyelid driving motor 21 receives electrical power 52 from an electrical power module 50 and eyelid control signals 42131 from a robotic eye controller 40 to close the upper eyelid 24, the eyelid driving motor 21 rotate counter-clockwise in a predetermined angle to rotate the first eyelid driving arm 22 counter-clockwise, the first eyelid driving arm 22 drives the eyelid driving rod 23 backward causing the upper eyelid 24 to rotate along the upper eyelid rotating axis 240 to close the upper eyelid 24. When the eyelid driving motor 21 receives the eyelid control signals 42131 to open the upper eyelid 24, the eyelid driving motor 21 rotate clockwise in a predetermined angle to rotate the first eyelid driving arm 22 clockwise, the first eyelid driving arm 22 drives the eyelid driving rod 23 forward causing the upper eyelid 24 to rotate along the upper eyelid rotating axis 240 to open the upper eyelid 24.

In certain embodiments, the eyelid driving motor 21 is positioned on the front panel 32 of the robotic eye body 30 through a pair of eyelid driving motor mounting brackets 212. The eyelid driving motor 21 also includes a set of eyelid driving motor control input terminals 213 to receive the electrical power 52 and the eyelid control signals 42131.

In certain embodiments, as shown in FIG. 8, the robotic eye controller 40 includes: a processor 41 and a non-volatile storage device 42 storing an operating system 420, and computer executable instructions 421. The computer executable instructions 421 include a robotic eye control input module 4211, an eyeball control module 4212 having an eyeball vertical control module 42121 and an eyeball horizontal control module 42122, and an eyelid control module 4213. When executed by the processor 41, the computer executable instructions 421 cause the processor to perform: receiving, by the robotic eye control input module 4211, eyeball control input signals 42111 and eyelid control input signals 42112 from a robotic controller (not shown in FIG. 8), transmitting the eyeball control input signals 42111 to the eyeball control module 4212, and the eyelid control input signals 42121 to the eyelid control module 4213.

When the eyeball control input signals 42111 contain vertical movement signals, the computer executable instructions 421 cause the eyeball vertical control module 42121 to generate the eyeball vertical control signals 421211 and transmitting the eyeball vertical control signals 421211 generated to the eyeball vertical driving mechanism 11 of the robotic eyeball driving system 10 to drive the first eyeball 122 and the second eyeball 123 to move vertically.

When the eyeball control input signals 42111 contain horizontal movement signals, the computer executable instructions 421 cause the eyeball horizontal control module 42122 to generate the eyeball horizontal control signals 421221 and transmitting the eyeball horizontal control signals 421221 generated to the eyeball horizontal driving mechanism 12 of the robotic eyeball driving system 10 to drive the first eyeball 122 and the second eyeball 123 to move horizontally.

When the eyelid control input signals 42112 contain eyelid movement signals, the computer executable instructions 421 cause the eyelid control module 4213 to generate the eyelid control signals 42131 and transmitting the eyelid control signals 42131 generated to the eyelid driving mechanism 201 to drive the upper eyelid 24 to move up and down.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A robotic eyeball driving system, comprising:
   a robotic eye body having a front panel having a first eye socket and a second eye socket, and a rear panel;
   a first eyeball and a second eyeball positioned in the first eye socket and the second eye socket, respectively, wherein the first eye socket and the second eye socket limit the first eyeball and the second eyeball to rotate around a first eyeball center and a second eyeball center, respectively;
   an eyeball horizontal driving mechanism having an eyeball horizontal movement frame, wherein the first eyeball and the second eyeball are rotatably attached to the eyeball horizontal movement frame to drive the first eyeball and the second eyeball to rotate horizontally; and
   an eyeball vertical driving mechanism having an eyeball vertical movement block, wherein the eyeball vertical movement block comprises an upper holding arm and a lower holding arm of an eyeball horizontal movement frame holder, and the upper holding arm and the lower holding arm of the eyeball horizontal movement frame holder holds the eyeball horizontal movement frame and allows the eyeball horizontal movement frame to slide horizontally, wherein when the eyeball vertical movement block moves vertically, the eyeball horizontal movement frame moves vertically along with the eyeball vertical movement block and drives the first eyeball and the second eyeball to rotate vertically, and when the eyeball horizontal movement frame slides horizontally, the eyeball horizontal movement frame drives the first eyeball and the second eyeball to rotate horizontally.

2. The robotic eyeball driving system of claim 1, wherein the eyeball vertical driving mechanism and the eyeball horizontal driving mechanism drive the first eyeball and the second eyeball, concurrently and independently.

3. The robotic eyeball driving system of claim 1, wherein the eyeball vertical movement block comprises a sliding groove, and the rear panel comprises a sliding block for the eyeball vertical movement block, wherein the sliding block is positioned inside the sliding groove of the eyeball vertical movement block to limit the eyeball vertical movement block to move vertically along an eyeball vertical movement direction.

4. The robotic eyeball driving system of claim 1, wherein the eyeball vertical driving mechanism comprises:
    an eyeball vertical driving motor for driving the first eyeball and the second eyeball vertically, wherein the eyeball vertical driving motor comprises a first eyeball vertical rotation axial and the first eyeball vertical rotation axial rotates along a first eyeball vertical rotation axis;
    a first eyeball vertical driving arm attached to the first eyeball vertical rotation axial;
    a second eyeball vertical driving arm rotatably attached to the first eyeball vertical driving arm along a second eyeball vertical rotation axis; and
    an eyeball vertical driving shaft rotatably attached to the second eyeball vertical driving arm in one end and fixedly attached to the eyeball vertical movement block in another end,
    wherein when the eyeball vertical driving motor receives electrical power and eyeball vertical control signals from a robotic eye controller to move the first eyeball and the second eyeball upward, the eyeball vertical driving motor rotate counter-clockwise in a predetermined angle to rotate the first eyeball vertical driving arm counter-clockwise, the first eyeball vertical driving arm drives the second eyeball vertical driving arm downward, and drives the eyeball vertical movement block downward causing the first eyeball and the second eyeball to rotate upward synchronously, and when the eyeball vertical driving motor receives the eyeball vertical control signals to move the first eyeball and the second eyeball downward, the eyeball vertical driving motor rotate clockwise in a predetermined angle to rotate the first eyeball vertical driving arm clockwise, the first eyeball vertical driving arm lifts the second eyeball vertical driving arm upward, and drives the eyeball vertical movement block upward causing the first eyeball and the second eyeball to rotate downward synchronously.

5. The robotic eyeball driving system of claim 4, wherein the eyeball horizontal driving mechanism comprises:
    the eyeball horizontal movement frame, wherein the eyeball horizontal movement frame defines a first eyeball installation hole for hosting a first eyeball horizontal rotation axial along a first eyeball horizontal rotation axis, and the eyeball horizontal movement frame comprises a cylindrical eyeball horizontal movement rod to allow the eyeball horizontal movement frame to slide horizontally and rotate when the eyeball vertical movement block moves vertically; and
    an eyeball horizontal driving motor positioned on the eyeball horizontal movement frame, wherein the eyeball horizontal driving motor comprises a second eyeball horizontal rotation axial rotating along a second eyeball horizontal rotation axis, wherein the second eyeball horizontal rotation axial is attached to a second eyeball support of the second eyeball to rotate the second eyeball horizontally,
    wherein when the eyeball horizontal driving motor receives the electrical power and eyeball horizontal control signals from the robotic eye controller to move the first eyeball and the second eyeball to the left, the eyeball horizontal driving motor rotate clockwise in a predetermined angle to drive the second eyeball support to rotate clockwise around the second eyeball center, causing the eyeball horizontal movement frame to slide to the right, and the first eyeball and the second eyeball to rotate to the left synchronously, when the eyeball horizontal driving motor receives the eyeball horizontal control signals to move the first eyeball and the second eyeball to the right, the eyeball horizontal driving motor rotate counter-clockwise in a predetermined angle to drive the second eyeball support to rotate counter-clockwise around the second eyeball center, causing the eyeball horizontal movement frame to slide to the left, and the first eyeball and the second eyeball to rotate to the right synchronously.

6. The robotic eyeball driving system of claim 5, wherein the eyeball vertical driving motor is positioned on the rear panel of the robotic eye body through a pair of eyeball vertical driving motor mounting brackets, and the eyeball vertical driving motor comprises a set of eyeball vertical driving motor control input terminals to receive the electrical power and the eyeball vertical control signals, and the eyeball horizontal driving motor is positioned on the eyeball horizontal movement frame through a pair of eyeball horizontal driving motor mounting bracket, and the eyeball horizontal driving motor comprises a set of eyeball horizontal driving motor control input terminals to receive the electrical power and the eyeball horizontal control signals.

7. A robotic eyelid driving system, comprising:
    a robotic eye body having a front panel having a first eye socket and a second eye socket, and a rear panel;
    a lower eyelid having a first lower eyelid and a second lower eyelid, wherein the lower eyelid is fixedly attached to the front panel of the robotic eye body;
    an upper eyelid having a first upper eyelid and a second upper eyelid, wherein the upper eyelid is rotatably attached to the front panel of the robotic eye body along an upper eyelid rotating axis; and wherein the first upper eyelid and the first lower eyelid form the first eye socket, and the second upper eyelid and the second lower eyelid form the second eye socket, respectively;
    an eyelid driving mechanism to drive the upper eyelid open and close to simulate eye blinking.

8. The robotic eyelid driving system of claim 7, wherein the eyelid driving mechanism comprises:
    an eyelid driving motor for driving the upper eyelid, wherein the eyelid driving motor rotates along a first eyelid driving axis through a first eyelid driving shaft;
    a first eyelid driving arm having a first eyelid driving shaft hole in a first end to receive the first eyelid driving shaft and a second eyelid driving shaft in a second end;
    an eyelid driving rod defining a second eyelid driving shaft hole in a first end and an upper eyelid driving shaft hole in a second end, wherein the second eyelid driving shaft is rotatably attached to the second eyelid driving shaft hole; and an upper eyelid driving arm having an upper eyelid driving shaft in a first end, and a second end attached to an upper eyelid rotating shaft, wherein the upper eyelid driving shaft is rotatably attached to the upper eyelid driving shaft hole, wherein when the eyelid driving motor receives electrical power and eyelid control signals from a robotic eye controller to close the upper eyelid, the eyelid driving motor rotate counter-clockwise in a predetermined angle to rotate the first eyelid driving arm counter-clockwise, the first eyelid driving arm drives the eyelid driving rod backward causing the upper eyelid to rotate along the upper eyelid rotating axis to close the upper eyelid, and when the eyelid driving motor receives the eyelid control signals to open the upper eyelid, the eyelid driving motor rotate clockwise in a predetermined angle to rotate the first eyelid driving arm clockwise, the first eyelid driving arm drives the eyelid driving rod forward causing the upper eyelid to rotate along the upper eyelid rotating axis to open the upper eyelid.

9. The robotic eyelid driving system of claim 8, wherein the eyelid driving motor is positioned on the front panel of the robotic eye body through a pair of eyelid driving motor mounting brackets, and the eyelid driving motor comprises a set of eyelid driving motor control input terminals to receive the electrical power and the eyelid control signals.

10. A robotic eye system, comprising:
a robotic eye body having a front panel having a first eye socket and a second eye socket, and a rear panel;
a first eyeball and a second eyeball positioned in the first eye socket and the second eye socket, respectively, wherein the first eye socket and the second eye socket limit the first eyeball and the second eyeball to rotate around a first eyeball center and a second eyeball center, respectively;
a lower eyelid having a first lower eyelid and a second lower eyelid, wherein the lower eyelid is fixedly attached to the front panel of the robotic eye body;
an upper eyelid having a first upper eyelid and a second upper eyelid, wherein the upper eyelid is rotatably attached to the front panel of the robotic eye body along an upper eyelid rotating axis;
an eyeball horizontal driving mechanism having an eyeball horizontal movement frame, wherein the first eyeball and the second eyeball are rotatably attached to the eyeball horizontal movement frame to drive the first eyeball and the second eyeball to rotate horizontally;
an eyeball vertical driving mechanism having an eyeball vertical movement block, wherein the eyeball vertical movement block comprises an upper holding arm and a lower holding arm of an eyeball horizontal movement frame holder, and the upper holding arm and the lower holding arm of the eyeball horizontal movement frame holder holds the eyeball horizontal movement frame and allows the eyeball horizontal movement frame to slide horizontally;
an eyelid driving mechanism to drive the upper eyelid open and close to simulate eye blinking; and
a robotic eye controller to receive eyeball control input signals and eyelid control input signals and generate eyeball vertical control signals, eyeball horizontal control signals, and eyelid control signals for driving the first eyeball, the second eyeball, and the upper eyelid respectively.

11. The robotic eye system of claim 10, wherein the eyeball vertical driving mechanism and the eyeball horizontal driving mechanism drive the first eyeball and the second eyeball, and the eyelid driving mechanism to drive the upper eyelid, concurrently and independently.

12. The robotic eye system of claim 10, wherein the first upper eyelid and the first lower eyelid form the first eye socket, and the second upper eyelid and the second lower eyelid form the second eye socket, respectively.

13. The robotic eye system of claim 10, wherein the eyeball vertical movement block comprises a sliding groove, and the rear panel comprises a sliding block for the eyeball vertical movement block, wherein the sliding block is positioned inside the sliding groove of the eyeball vertical movement block to limit the eyeball vertical movement block to move vertically along an eyeball vertical movement direction.

14. The robotic eye system of claim 13, wherein the eyeball horizontal driving mechanism comprises:
the eyeball horizontal movement frame, wherein the eyeball horizontal movement frame defines a first eyeball installation hole for hosting a first eyeball horizontal rotation axial along a first eyeball horizontal rotation axis, and the eyeball horizontal movement frame comprises a cylindrical eyeball horizontal movement rod to allow the eyeball horizontal movement frame to slide horizontally and rotate when the eyeball vertical movement block moves vertically; and
an eyeball horizontal driving motor positioned on the eyeball horizontal movement frame, wherein the eyeball horizontal driving motor comprises a second eyeball horizontal rotation axial rotating along a second eyeball horizontal rotation axis, wherein the second eyeball horizontal rotation axial is attached to a second eyeball support of the second eyeball to rotate the second eyeball horizontally,
wherein when the eyeball horizontal driving motor receives the electrical power and the eyeball horizontal control signals from the robotic eye controller to move the first eyeball and the second eyeball to the left, the eyeball horizontal driving motor rotate clockwise in a predetermined angle to drive the second eyeball support to rotate clockwise around the second eyeball center, causing the eyeball horizontal movement frame to slide to the right, and the first eyeball and the second eyeball to rotate to the left synchronously, when the eyeball horizontal driving motor receives the eyeball horizontal control signals to move the first eyeball and the second eyeball to the right, the eyeball horizontal driving motor rotate counter-clockwise in a predetermined angle to drive the second eyeball support to rotate counter-clockwise around the second eyeball center, causing the eyeball horizontal movement frame to slide to the left, and the first eyeball and the second eyeball to rotate to the right synchronously.

15. The robotic eye system of claim 10, wherein the eyeball vertical driving mechanism comprises:
an eyeball vertical driving motor for driving the first eyeball and the second eyeball vertically, wherein the eyeball vertical driving motor comprises a first eyeball vertical rotation axial and the first eyeball vertical rotation axial rotates along a first eyeball vertical rotation axis;

a first eyeball vertical driving arm attached to the first eyeball vertical rotation axial;

a second eyeball vertical driving arm rotatably attached to the first eyeball vertical driving arm along a second eyeball vertical rotation axis; and an eyeball vertical driving shaft rotatably attached to the second eyeball vertical driving arm in one end and fixedly attached to the eyeball vertical movement block in another end, wherein when the eyeball vertical driving motor receives the electrical power and the eyeball vertical control signals from the robotic eye controller to move the first eyeball and the second eyeball upward, the eyeball vertical driving motor rotate counter-clockwise in a predetermined angle to rotate the first eyeball vertical driving arm counter-clockwise, the first eyeball vertical driving arm drives the second eyeball vertical driving arm downward, and drives the eyeball vertical movement block downward causing the first eyeball and the second eyeball to rotate upward synchronously, and when the eyeball vertical driving motor receives the eyeball vertical control signals to move the first eyeball and the second eyeball downward, the eyeball vertical driving motor rotate clockwise in a predetermined angle to rotate the first eyeball vertical driving arm clockwise, the first eyeball vertical driving arm lifts the second eyeball vertical driving arm upward, and drives the eyeball vertical movement block upward causing the first eyeball and the second eyeball to rotate downward synchronously.

16. The robotic eye system of claim 15, wherein the eyeball vertical driving motor is positioned on the rear panel of the robotic eye body through a pair of eyeball vertical driving motor mounting brackets, and the eyeball vertical driving motor comprises a set of eyeball vertical driving motor control input terminals to receive the electrical power and the eyeball vertical control signals, and the eyeball horizontal driving motor is positioned on the eyeball horizontal movement frame through a pair of eyeball horizontal driving motor mounting bracket, and the eyeball horizontal driving motor comprises a set of eyeball horizontal driving motor control input terminals to receive the electrical power and the eyeball horizontal control signals.

17. The robotic eye system of claim 10, wherein the eyelid driving mechanism comprises:
an eyelid driving motor for driving the upper eyelid, wherein the eyelid driving motor rotates along a first eyelid driving axis through a first eyelid driving shaft;
a first eyelid driving arm having a first eyelid driving shaft hole in a first end to receive the first eyelid driving shaft and a second eyelid driving shaft in a second end;
an eyelid driving rod defining a second eyelid driving shaft hole in a first end and an upper eyelid driving shaft hole in a second end, wherein the second eyelid driving shaft is rotatably attached to the second eyelid driving shaft hole; and
an upper eyelid driving arm having an upper eyelid driving shaft in a first end, and a second end attached to an upper eyelid rotating shaft, wherein the upper eyelid driving shaft is rotatably attached to the upper eyelid driving shaft hole, wherein when the eyelid driving motor receives the electrical power and the eyelid control signals from the robotic eye controller to close the upper eyelid, the eyelid driving motor rotate counter-clockwise in a predetermined angle to rotate the first eyelid driving arm counter-clockwise, the first eyelid driving arm drives the eyelid driving rod backward causing the upper eyelid to rotate along the upper eyelid rotating axis to close the upper eyelid, and when the eyelid driving motor receives the eyelid control signals to open the upper eyelid, the eyelid driving motor rotate clockwise in a predetermined angle to rotate the first eyelid driving arm clockwise, the first eyelid driving arm drives the eyelid driving rod forward causing the upper eyelid to rotate along the upper eyelid rotating axis to open the upper eyelid.

18. The robotic eye system of claim 17, wherein the eyelid driving motor is positioned on the front panel of the robotic eye body through a pair of eyelid driving motor mounting brackets, and the eyelid driving motor comprises a set of eyelid driving motor control input terminals to receive the electrical power and the eyelid control signals.

19. The robotic eye system of claim 10, wherein the robotic eye controller comprises: a processor and a non-volatile storage device storing an operating system, and computer executable instructions, wherein the computer executable instructions comprise a robotic eye control input module, an eyeball control module having an eyeball vertical control module and an eyeball horizontal control module, and an eyelid control module, when executed by the processor, the computer executable instructions cause the processor to perform:

receiving, by the robotic eye control input module, eyeball control input signals and eyelid control input signals from a robotic controller;

transmitting the eyeball control input signals to the eyeball control module, and the eyelid control input signals to the eyelid control module;

generating, by the eyeball vertical control module, the eyeball vertical control signals and transmitting the eyeball vertical control signals generated to the eyeball vertical driving mechanism of the robotic eyeball driving system to drive the first eyeball and the second eyeball to move vertically, when the eyeball control input signals contain vertical movement signals;

generating, by the eyeball horizontal control module, the eyeball horizontal control signals and transmitting the eyeball horizontal control signals generated to the eyeball horizontal driving mechanism of the robotic eyeball driving system to drive the first eyeball and the second eyeball to move horizontally, when the eyeball control input signals contain horizontal movement signals; and generating, by the eyelid control module, eyelid control signals and transmitting the eyelid control signals generated to the eyelid driving mechanism to drive the upper eyelid to move up and down, when the eyelid control input signals contain eyelid movement signals.

* * * * *